United States Patent [19]

Sakakibara et al.

[11] Patent Number: 5,206,501
[45] Date of Patent: Apr. 27, 1993

[54] IMAGE-READING DEVICE HAVING A PHOTOELECTRIC TRANSDUCER

[75] Inventors: Jun Sakakibara; Hajime Nakamura; Junichi Koseki; Katsuya Nagamochi, all of Tokyo, Japan

[73] Assignee: Kabushiki Kaisha Toshiba, Kawasaki, Japan

[21] Appl. No.: 857,187

[22] Filed: Mar. 25, 1992

[30] Foreign Application Priority Data

Aug. 30, 1991 [JP] Japan .................. 3-220740

[51] Int. Cl.$^5$ ............................ H01J 40/14
[52] U.S. Cl. .................. 250/208.1; 358/461
[58] Field of Search ............. 250/208.1; 358/461, 358/465, 443, 446, 447, 448, 455

[56] References Cited

U.S. PATENT DOCUMENTS

| 3,952,144 | 4/1976 | Kolker | 178/6 |
| 4,806,780 | 2/1989 | Yamamoto et al. | 250/578 |
| 4,807,045 | 2/1989 | Shimano | 358/461 |
| 4,952,972 | 8/1990 | Someya | 355/68 |

FOREIGN PATENT DOCUMENTS 44-18332 11/1969 Japan .

Primary Examiner—David C. Nelms
Assistant Examiner—T. Davenport
Attorney, Agent, or Firm—Foley & Lardner

[57] ABSTRACT

An image-reading device, in which the 1-bit signals a CCD line sensor has generated from the light applied from an illumination lamp and reflected from an original are shading-corrected, thereby forming image data. Before scanning the original, a black reference signal, a white reference signal at a level higher than that of the black reference level, and three intermediate reference signals are generated and stored into memories. During the scanning of the original, a selector selects two of the reference signals in accordance with the level of each signal output by the CCD line sensor, and the difference between the signal output by the sensor and the black reference signal is shading-corrected, by using the two reference signals selected by the selector. The signal output by the CCD line sensor can therefore made linearly proportional to the intensity of the input light, even if the CCD line sensor has no linear input-output characteristic or even if the photoelectric elements of the sensor have different input-output characteristics.

19 Claims, 6 Drawing Sheets

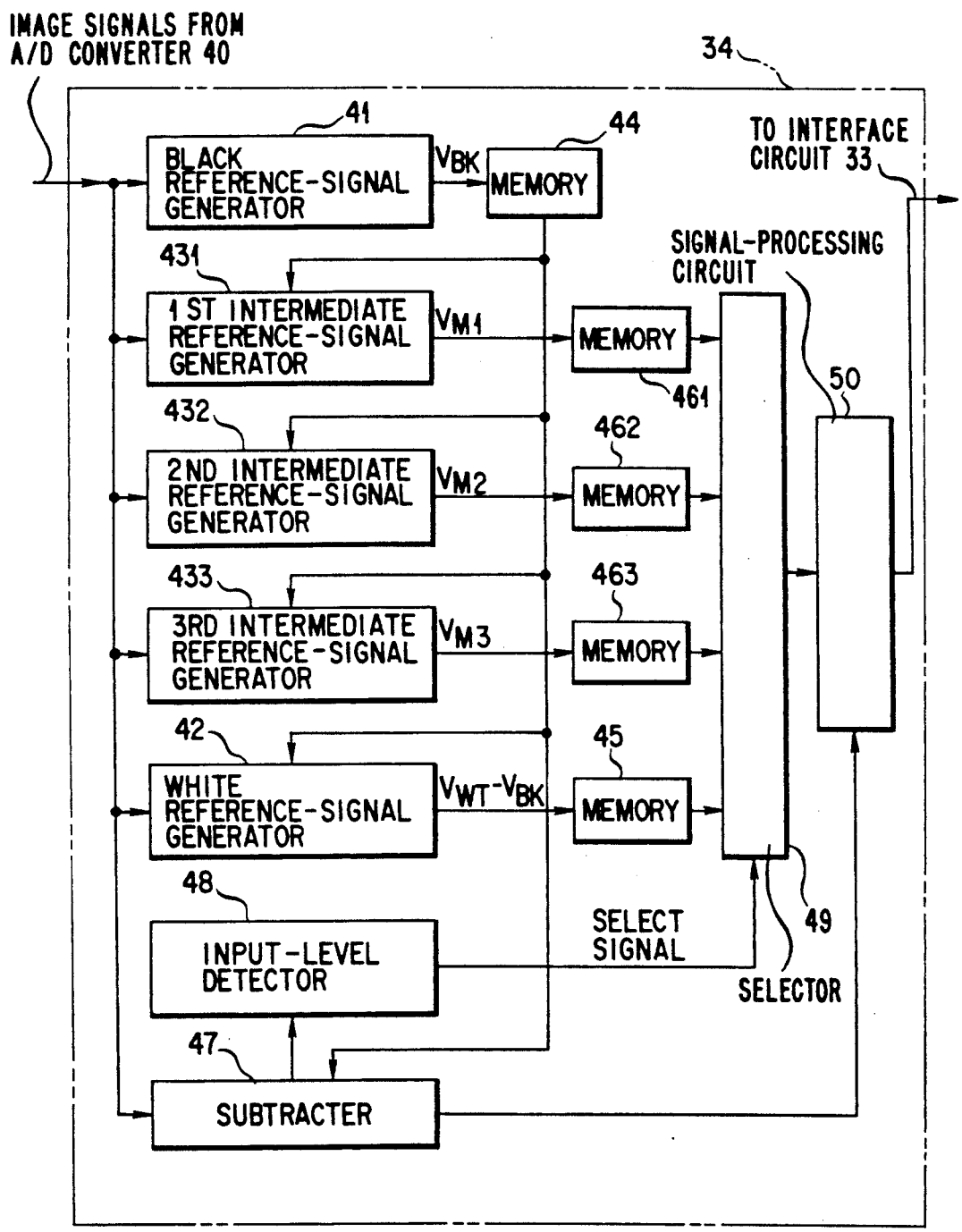
F I G. 5

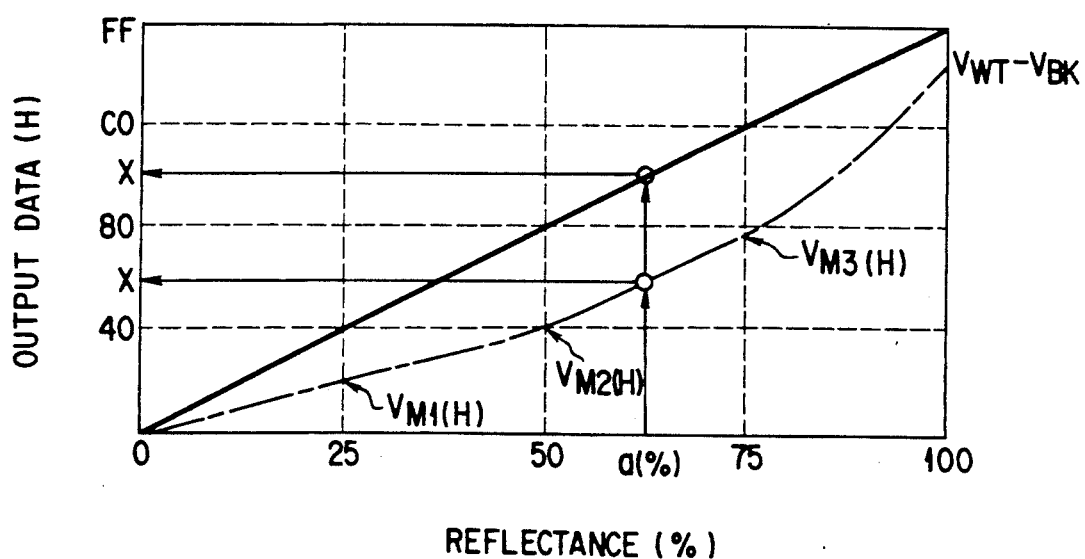
F I G. 8

IMAGE-READING DEVICE HAVING A PHOTOELECTRIC TRANSDUCER

BACKGROUND OF THE INVENTION

1. Field of the Invention

The present invention relates to an image-reading device which has a photoelectric transducer designed to input image data.

2. Description of the Related Art

Image-reading devices each having a photoelectric transducer are used in facsimile machines, copying machines, image-recognizing apparatuses, optical filing systems, and the like. Recently it has been increasingly demanded that the image-reading device of this type operate at higher speed and output data representing a high-quality image. Hence, it is now required that the image-reading device comprise a photoelectric transducer which is highly sensitive and can convert optical signals to electric signals at high speed, and also that the electric signals output by the transducer be processed with high accuracy within the image-reading device.

Various photoelectric transducers are available at present. Of these, the CCD line sensor is the most popular. In an image-reading device having a CCD line sensor and an image-reading unit, the signals output by the sensor are subjected to shading correction, bit by bit, thereby providing image data. The shading correction comprises two steps. In the first step, the one-bit pixel data items defining an image are corrected based on the difference between the black reference signal and the white reference signal, thereby forming corrected image data. In the second step, the low-frequency distortion and high-frequency distortion occurring in the data-reading unit are minimized in accordance with the corrected image data. (Such shading correction is disclosed in Published Unexamined Japanese Patent Application No. 62-293384.)

Shading correction will be described in more detail, with reference to the graph of FIG. 1 which shows the results of the shading correction performed in a method.

As can be understood from FIG. 1, a signal VoutO output by a CCD line sensor which is reading an image formed on an original. The CCD line sensor outputs a black reference signal $V_{BK}$ upon receipt of the light reflected from an original having reflectance of 0%. The magnitude of the signal which the CCD line sensor generates from the light reflected from an original is linearly proportional to the reflectance of the original. When the CCD line sensor receives the light reflected from an original having reflectance of 100%, it outputs a white reference signal $V_{WT}$-$V_{BK}$. It should be noted that the term "reflectance of 100%" means the reflectance of a standard white board, not actual "100%."

In FIG. 1, Vout1 is a signal which has been obtained by converting an output signal of the CCD line sensor to an 8-bit digital signal, and then by subjecting the digital signal to normalization, wherein the black reference signal $V_{BK}$ and the white reference signal $V_{WT}$-$V_{BK}$ having values of 00(H) and FF(H), respectively are applied. Here, the following relation is established:

$$Vout1 = FF \times (VoutO - V_{BK})/(V_{WT} - V_{BK})$$

The normalization, thus effected, minimizes both high-frequency distortion and low-frequency distortion, enabling the output signal of the CCD line sensor to change linearly from 00H to FFH.

The higher the sensitivity of the CCD line sensor, the greater the possibility that an amplifier is connected to the output of the CCD line sensor. The characteristic of the amplifier affects that of the CCD line sensor. In the worst case, the sensor fails to output whose magnitude changes linearly, in accordance with the intensity of the input light. Consequently, if the shading correction is effected on the output signal of the CCD line sensor based on only the black and white reference signals of the types described above, the output signal of the CCD line sensor will deviate, in magnitude, from the most desirable output signal, as is illustrated in FIG. 2.

As the sensitivity of CCD line sensors increases at the expense of the linearity of input-output characteristic, the conventional shading correction, in which use is made of only the black reference signal and the white reference signal, can no longer render the output signal of a CCD line sensor exactly proportional to the intensity of the light applied to the sensor.

SUMMARY OF THE INVENTION

The object of this invention is to provide an image-reading device having a photoelectric transducer, in which the output signal of the transducer can be shading-corrected to be exactly proportional, in magnitude, to the light applied to the transducer, even if the transducer has no linear input-output characteristic.

In a first aspect of the invention, there is provided an image-reading device comprising illumination means for applying light to an object to be illuminated including an original placed on an original table, output means for outputting electric signals in accordance with the light reflected from the original which said illumination means applies the light to, reference signal generating means for generating a first reference signal, a second reference signal at a level higher than that of the first reference signal, or a third reference signal at a level higher than that of the first reference signal and lower than that of said second reference signal, in accordance with the level of the electric signal outputed by said output means, memory means for storing the first, second, and third reference signals generated by said reference signal generating means, and processing means for performing shading correction on the signal outputed by said output means, by using the first, second and third reference signals stored in said memory means.

In a second aspect of the present invention, there is provided an image-reading device comprising illumination means for applying light to a white reference plate and an original placed on an original table, output means for outputting electric signals in accordance with the light reflected from the white reference plate and the original, first reference signal generating means including means for generating a black reference signal having a black level obtained no light is incident to said output means, means for generating a white reference signal at having a white level obtained as a difference between an output level obtained when the white reference plate is illuminated by said light and said black level, second reference signal generating means having filters having the same spectral characteristic and different transmittances, for generating a plurality of intermediate reference signals having levels higher than that of the black reference signal and lower than that of the white reference signal, from the signals which said output means generates from light beams reflected from said white reference plate and applied through said filters, memory means for storing the black reference signal and the white reference signal which said first reference signal generating means have generated, and also the intermediate reference signals which said second reference signal generating means have generated, signal-level detecting means for detecting the level of an signal output by said output means, and processing means for reading two of the reference signals stored in said memory means, in accordance with the the level detected by said signal-level detecting means, and for performing shading correction on the signal outputed by said output means, by using the two reference signals selected.

In a third aspect of this invention, there is provided an image-reading device comprising illumination means for applying light to a white reference plate and an original placed on an original table, output means for outputting electric signals in accordance with the light reflected from the white reference plate and the original, reference signal generating means including means for generating a black reference signal having a black level obtained when no light is incident to said output means, means for generating a white reference signal at having a white level obtained as a difference between an output level obtained when the white reference plate is illuminated by said light and said black level, and means for generating several intermediate reference signals at levels higher than that of the black reference signal and lower than that of the white reference signal, in accordance with the level of the electric signal output by said outputed means, memory means for storing the black reference signal, the white reference signal, and the intermediate reference signals which have been generated by said reference signal generating means, signal-level detecting means for detecting the level of an signal output by said output means, and processing means for reading two of the reference signals stored in said memory means, in accordance with the the level detected by said signal-level detecting means, and for performing shading correction on the signal outputed by said output means, by using the two reference signals selected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a block diagram illustrating the image-processing circuit used in the scanner of FIG. 3;

FIG. 8 is a diagram explaining the image-circuit of FIG. 5 performs another method of shading correction.

DETAILED DESCRIPTION OF THE PREFERRED EMBODIMENTS

Figure 3:
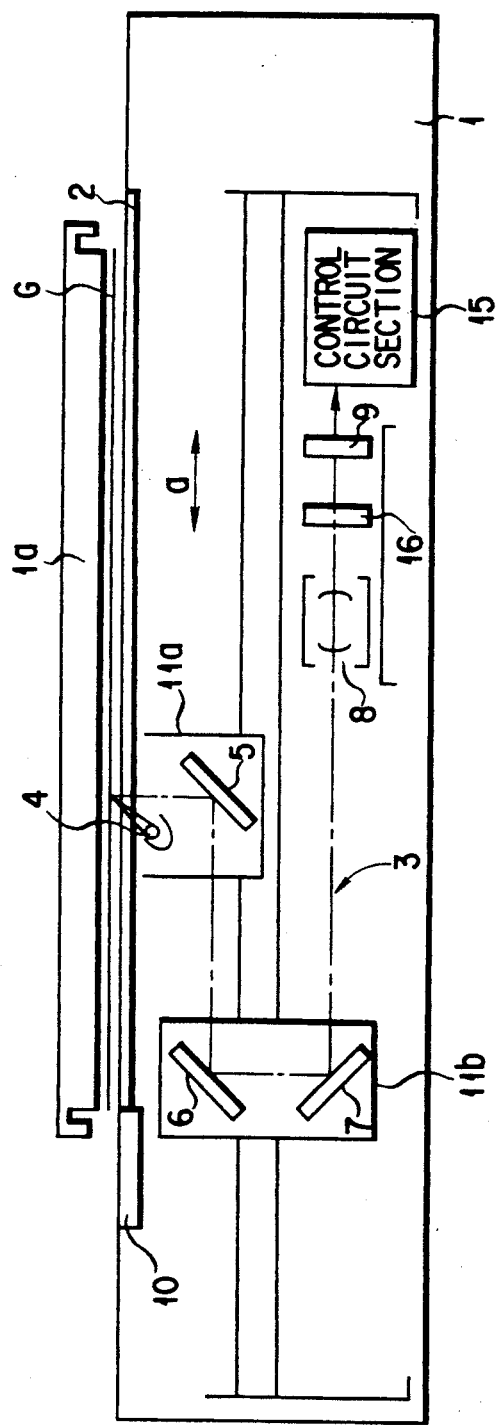
FIG. 3 is a diagram schematically showing a scanner which is an embodiment of the present invention.

FIG. 3 shows a scanner which is an image-reading device according to the present invention. The scanner is designed to read the image formed on an original, generates image signals representing the image, and outputs the image signals to an external apparatus such as a computer.

As is evident from FIG. 3, the scanner comprises a housing 1. An operation panel (not shown) is mounted on the upper-front portion of the housing 1. An original table (i.e., a platen glass) 2 is fixed atop the housing 1. An original cover 1a is hinged to one of the housing top and can be opened and closed. When placed in the closed position, the cover 1a covers up the original table 2.

As is shown in FIG. 3, the housing 1 contains an original-scanning section 3, which is located right below the original table 2. The section 3 is designed to optically scan an original G placed on the table 2. The section 3 comprises a first carriage 11a, a second carriage 11b, a focusing lens block 8, and a photoelectric transducer 9. The first carriage 11a supports an illumination lamp 4 and a mirror 5. The second carriage 11b supports two mirrors 6 and 7. The lamp 4 applies light to the original G, and the mirror 5 receives the light reflected from the original G, and guides it to the mirror 6 mounted on the second carriage 11b. The mirror 6 receives the light and supplies it to the mirror 7, which reflects the light to the focusing lens block 8. The lens block 8 focuses the light and applies the light toward the photoelectric transducer 9. The transducer 9 converts the input light, or the image formed on its light-receiving surface, into electric signals.

The first carriage 11a supports a reflector, besides the illumination lamp 4 and the mirror 5. The reflector partly surrounds the lamp 4, for collecting the light beams emitted from the lamp 4 and reflect them to the original G put on the original table 2.

The carriages 11a and 11b are connected to each other by a timing belt (not shown), and can be moved back and forth in the directions of arrows a , in parallel to the original table 2. More precisely, the second carriage 11b is moved at half the speed of the first carriage 11a in the same direction as the first carriage 11a. The optical path, along which the light propagates and which extends from the original G to the transducer 9, is thereby maintained constant, no matter how long the first carriage 11a moves.

The first carriage 11a and the second carriage 11b are driven by a stepping motor (later described).

The photoelectric transducer 9 is a CCD line sensor which has a plurality of photoelectric elements, for example charge-coupled devices (CCDs), which are aligned in an array extending at right angles to the optical path.

A white reference plate 10 is located beside the original table 2. Before scanning the original the original G, the first carriage 11a and second carriage 11b of the original-scanning section 3 are moved until the lamp 4 is located right below the white reference plate 10. The light from the lamp 4 is then applied onto the plate 10, and the light reflected therefrom is applied to the photoelectric transducer 9, thereby to generate a white reference signal.

The housing 1 further contains a control circuit section 15 which is designed to process the signals output by the CCD line sensor 9, converting them to stable digital signals.

The original-scanning section 3 further comprises three filters 16 (only one shown in FIG. 3), which have different transmittances and the same spectral characteristic. To be more specific, the filters 16 have transmitances of, for example, 25%, 50%, 75%, respectively. These filters 16 are located, one at a time, between the lens block 8 and the transducer 9 so that that the control circuit section 15 may generate intermediate reference signals. Alternatively, the filter 16 can be placed at any other position in the optical path and between the lens block 8 and the photoelectric transducer 9.

Figure 4:
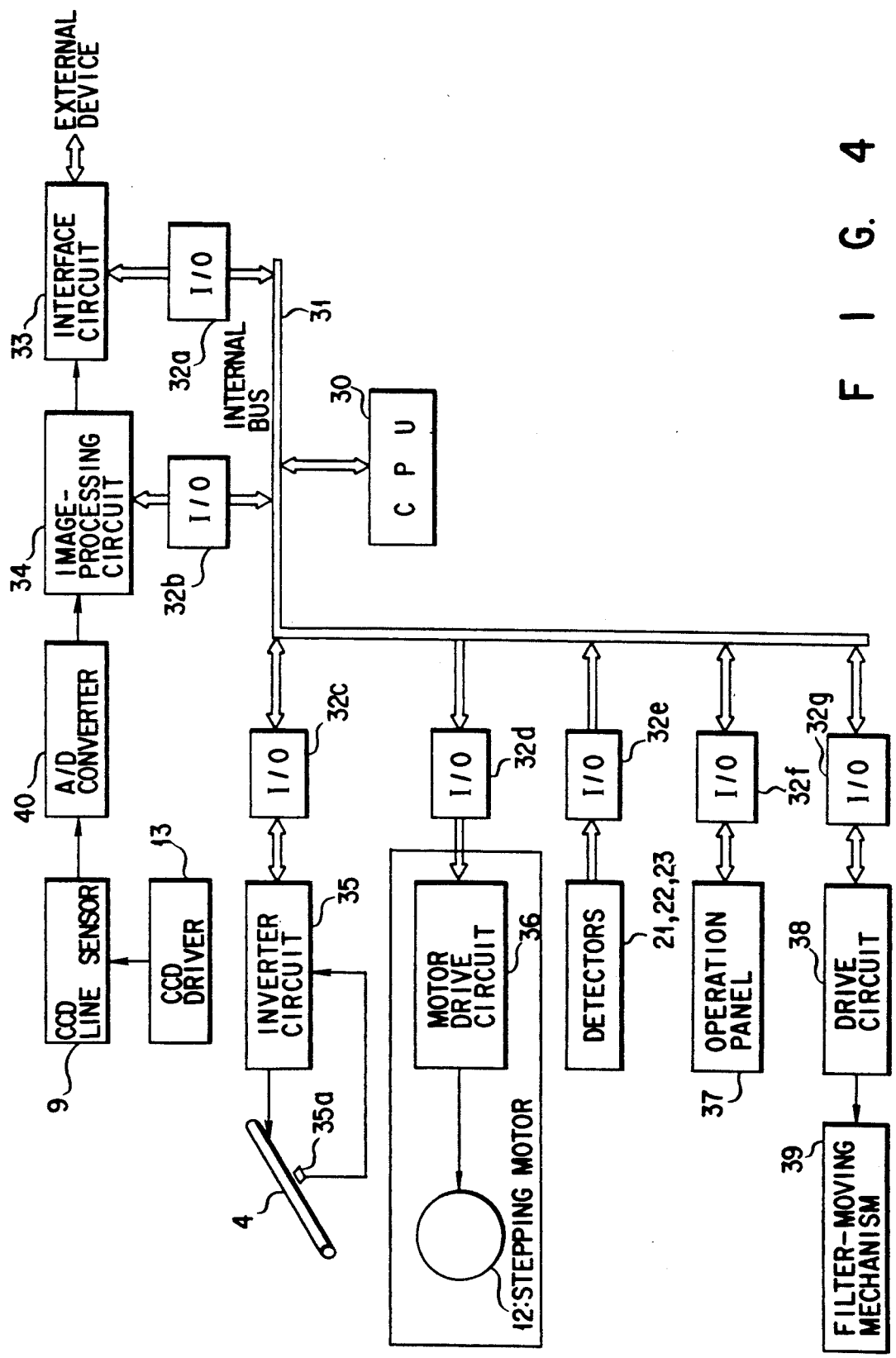
FIG. 4 is a block diagram of the control system incorporated in the scanner shown in in FIG. 3.

FIG. 4 shows the control circuit section 15 of the scanner shown in FIG. 3. The section 15 has a CPU (Central Processing Unit) 30 for controlling any other component of the section 15. The CPU 3 is connected to an internal bus 31. Connected to the bus 31 by input-/output circuits 32a to 32g are: detectors 21 to 23, an interface circuit 33, an image-processing circuit 34, an inverter circuit 35, a motor drive circuit 36, the operation panel 37, and a dive circuit 38. The control circuit section 15 further comprises an A/D converter 40 for converting the analog signals output by the CCD line sensor 9 to digital signals.

The image-processing circuit 34 performs image processing, such as shading correction, on the signals supplied from the digital signals output by the A/D converter 40, thereby generating image signals. The image signals are supplied to an external device through the interface circuit 33. The inverter circuit 35 controls the illumination lamp 4 in accordance with the signal output by a detector 35a and representing the amount of the light the lamp 4 is emitting, thereby adjusting the amount of light which the lamp 4 is to emit. The motor drive circuit 36 drives the stepping motor 12, whereby the carriages 11a and 11b of the original-scanning section 3 at one of various speeds, which has been selected in accordance with the magnification in which to read the image from the original G. The operation panel 37 is designed to input various instructions when operated by a user, and to display the operating conditions of the scanner. The drive circuit 38 drives a filter-moving drive mechanism 39, which in turn drives the filter 16.

FIG. 5 shows the image-processing circuit 34. As is evident from this figure, the circuit 34 comprises a black reference-signal generator 41, a white reference-signal generator 42, three intermediate reference-signal generators 431, 432 and 433, four memories 44, 45, 461, 462 and 463, a subtracter 47, an input-level detector 48, a selector 49, and a signal-processing circuit 50.

The black reference-signal generator 41 is used to generate a black reference signal $V_{BK}$ from the pixel signals which the CCD line sensor 9 generates when it receives no light at all. The signal $V_{BK}$ is generated by adding the black-pixel signals output by the A/D converter 40 and representing several lines of black pixels, and by dividing the sum of the black-pixel signals by the number of lines. Hence, the black reference signal $V_{BK}$ represents the mean darkness of the black-pixel lines.

The white reference-signal generator 42 is designed to generate a white reference signal $V_{WT}$-$V_{BK}$ from the black reference $V_{BK}$ and the pixel signals which the CCD line sensor 9 generates when it receives the light emitted from the lamp 4 and reflected from the white reference plate 10. The white reference signal $V_{WT}$-$V_{BK}$ is produced by adding the 1-bit white-pixel signals output by the A/D converter 40 and representing several lines of white pixels, then dividing the sum of the white signals by the number of lines, thereby obtaining a signal $V_{WT}$ representing the mean whiteness of the white-pixel lines, and finally subtracting the black reference signal $V_{BK}$ from the mean-whiteness signal $V_{WT}$.

The first intermediate reference-signal generator 431 is designed to generate a first intermediate reference signal $V_{M1}$ from the black reference signal $V_{BK}$ and the signals which the CCD line sensor 9 generates from the light applied from the lamp 4 and reflected from the white reference plate 10, while the filter 16 having transmittance of 25% is inserted in the optical path extending from the plate 10 and the sensor 9. The first intermediate reference signal $V_{M1}$ is produced by adding the 1-bit pixel signals output by the A/D converter 40 and representing several lines of pixels, 1 then dividing the sum of these signals by the number of lines, thereby obtaining a signal showing the mean brightness of the pixel lines, and finally subtracting the black reference signal $V_{BK}$ from the mean-brightness signal.

The second intermediate reference-signal generator 432 is designed to generate a second intermediate reference signal $V_{M2}$ from the black reference signal $V_{BK}$ and the signals which the CCD line sensor 9 generates from the light applied from the lamp 4 and reflected from the white reference plate 10, while the filter 16 having transmittance of 50% is inserted in the optical path extending from the plate 10 and the sensor 9. The second intermediate reference signal $V_{M2}$ is produced by adding the 1-bit pixel signals output by the A/D converter 40 and representing several lines of pixels, then dividing the sum of these signals by the number of lines, thereby obtaining a signal showing the mean brightness of the pixel lines, and finally subtracting the black reference signal $V_{BK}$ from the mean-brightness signal.

The third intermediate reference-signal generator 433 is designed to generate a third intermediate reference signal $V_{M3}$ from the black reference signal $V_{BK}$ and the signals which the CCD line sensor 9 generates from the light applied from the lamp 4 and reflected from the white reference plate 10, while the filter 16 having transmittance of 75% is inserted in the optical path extending from the plate 10 and the sensor 9. The third intermediate reference signal $V_{M3}$ is produced by adding the 1-bit pixel signals output by the A/D converter 40 and representing several lines of pixels, then dividing the sum of these signals by the number of lines, thereby obtaining a signal showing the mean brightness of the pixel lines, and finally subtracting the black reference signal $V_{BK}$ from the mean-brightness signal.

The memory 44 is provided to store the black reference signal $V_{BK}$ which the black reference-signal generator 41 has generated. The memory 45 is used to store the white reference signal $V_{WT}$-$V_{BK}$ which the white reference-signal generator 42 has output. The memory 461 is used to store the first intermediate reference signal $V_{M1}$ which the reference-signal generator 431 has generated. The memory 462 is provided to store the second intermediate reference signal $V_{M2}$ which the reference-signal generator 432 has produced. The memory 463 is used to store the third intermediate reference signal $V_{M3}$ which the reference-signal generator 433 has generated.

The subtracter 47 is designed to subtracts the black reference signal $V_{BK}$, which is stored in the memory 44, from the image signal being output from the A/D converter 40.

The input-level detector 48 is designed determine which level the image signal being output from the A/D converter 40 has, a level corresponding to reflectance of less than 25%, a level equivalent to reflectance of at least 25% but less than 50%, a level corresponding to reflectance of at least 50% but less than 75%, or a level corresponding to reflectance of 75% to 100%, in accordance with the result of the subtraction performed by the subtracter 47.

The selector 49 is provided for selecting one or two of the reference signals stored in the memories 461, 462, 463 and 45, in accordance with the level of the image signal which the input-level detector 48 has determined. To be more specific, if the level detected is equivalent to reflectance of less than 25%, the selector 49 selects and outputs the first intermediate reference signal $V_{M1}$ stored in the memory 461 to the signal-processing circuit 50. If the level detected is equivalent to reflectance of at least 25% but less than 50%, the selector 49 selects the first and second intermediate reference signals $V_{M1}$ and $V_{M2}$ stored in the memories 461 and 462 and output these signals to the signal-processing circuit 50. If the level detected corresponds to reflectance of at least 50% but less than 75%, the selector 49 selects the second and third intermediate reference signals $V_{M2}$ and $V_{M3}$ stored in the memories 462 and 463 and output these signals to the signal-processing circuit 50. If the level detected is equivalent to reflectance of 75% to 100%, the selector 49 selects the third intermediate reference signal $V_{M3}$ and the white reference signal $V_{WT}$-$V_{BK}$ stored in the memories 463 and 45 and output these signals to the signal-processing circuit 50.

The signal-processing circuit 50 is designed to perform shading correction on the signal output by the subtracter 47 which is the difference between the image signal and the black reference signal $V_{BK}$, by using the reference signals or signals selected and output by the selector 49.

It will now be explained how the reference signals are generated in the image-processing circuit 34.

To generates the black reference signal $V_{BK}$, the illumination lamp 4 is turned off, thus applying no light to the CCD line sensor 9. Then, black reference-signal generator 41 adds the 1-bit black-pixel signals output by the A/D converter 40 and representing several lines of black pixels, and divides the sum of the black-pixel signals by the number of lines, thereby producing the black reference signal $V_{BK}$. The black reference signal $V_{BK}$, which represents the mean darkness of the black-pixel lines, is stored into the memory 44.

To generate the white reference signal $V_{WT}$-$V_{BK}$, the illumination lamp 4 is turned on, and the first and second carriages 11a and 11b are moved to such positions that the light reflected from the white reference plate 10 is applied to the CCD line sensor 9. The white reference-signal generator 42 adds the 1-bit white-pixel signals output by the A/D converter 40 and representing several lines of white pixels, then divides the sum of the white signals by the number of lines, thereby obtaining a signal $V_{WT}$ representing the mean whiteness of the white-pixel lines, and finally subtracts the black reference signal $V_{BK}$ from the mean-whiteness signal $V_{WT}$. The white reference signal $V_{WT}$-$V_{BK}$ is thereby produced. The signal $V_{WT}$-$V_{BK}$ is stored into memory 45.

To generate the first intermediate reference signal $V_{M1}$, the illumination lamp 4 is turned on, and the first and second carriages 11a and 11b are moved to such positions that the light reflected from the white reference plate 10 is applied to the CCD line sensor 9. Further, the filter 16 having transmittance of 25% is inserted in the optical path extending from the plate 10 and the sensor 9. The first intermediate reference-signal generator 431 adds the 1-bit pixel signals output by the A/D converter 40 and representing several lines of pixels, then divides the sum of these signals by the number of lines, thereby obtaining a signal showing the mean brightness of the pixel lines, and finally subtracts the black reference signal $V_{BK}$ from the mean-brightness signal. As a result, the first intermediate reference signal $V_{M1}$ is generated. The signal $V_{M1}$ is stored into the memory 461.

In order to generate the second intermediate reference signal $V_{M2}$, the illumination lamp 4 is turned on, and the first and second carriages 11a and 11b are moved to such positions that the light reflected from the white reference plate 10 is applied to the CCD line sensor 9. Further, the filter 16 having transmittance of 50% is inserted in the optical path extending from the plate 10 and the sensor 9. The second intermediate reference-signal generator 432 adds the 1-bit pixel signals output by the A/D converter 40 and representing several lines of pixels, then divides the sum of these signals by the number of lines, thereby obtaining a signal showing the mean brightness of the pixel lines, and finally subtracts the black reference signal $V_{BK}$ from the mean-brightness signal. The second intermediate reference signal $V_{M2}$ is thereby produced. The signal $V_{M2}$ is stored into the memory 462.

To generate the third intermediate reference signal $V_{M3}$, the illumination lamp 4 is turned on, and the first and second carriages 11a and 11b are moved to such positions that the light reflected from the white reference plate 10 is applied to the CCD line sensor 9. Also, the filter 16 having transmittance of 75% is inserted in the optical path extending from the plate 10 and the sensor 9. The third intermediate reference-signal generator 433 adds the 1-bit pixel signals output by the A/D converter 40 and representing several lines of pixels, then divides the sum of these signals by the number of lines, thereby obtaining a signal showing the mean brightness of the pixel lines, and finally subtracts the black reference signal $V_{BK}$ from the mean-brightness signal. As a result, the third intermediate reference signal $V_{M3}$ is generated. The signal $V_{M3}$, thus generated, is stored into the memory 463.

As has been described, each reference signal generator adds the 1-bit pixel signals output by the A/D converter 40 and representing several lines of pixels, then divides the su of these signals by the number of lines, thereby obtaining a signal showing the mean brightness of the pixel lines. This technique helps to improve the accuracy of the resultant reference signal.

Figure 6:
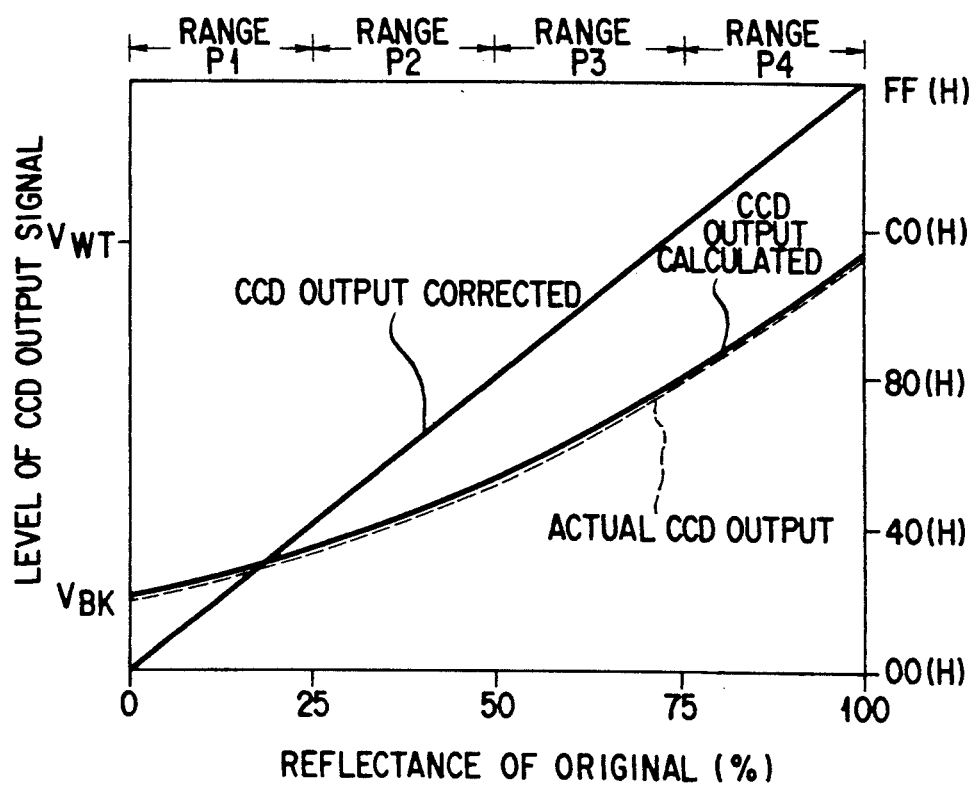
FIG. 6 is a graph representing the results of the shading correction conducted on an output signal of the CCD line sensor which is incorporated in the scanner of FIG. 3 and whose input-output characteristic is not linear.
Figure 7:
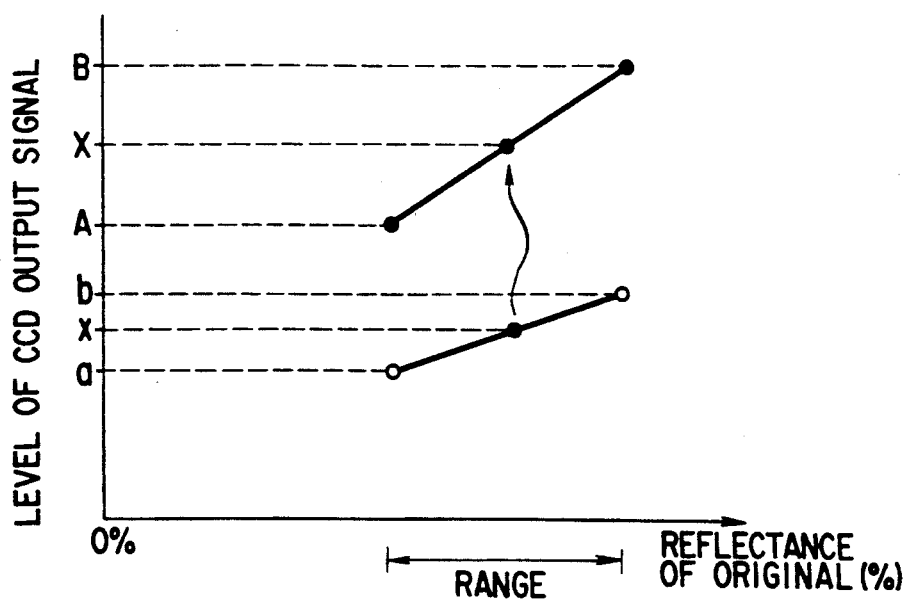
FIG. 7 is a diagram explaining the image-processing circuit of FIG. 5 performs a method of shading correction.

With reference to FIGS. 5 and 6, it will now be described, in detail, how the image-processing circuit 34 processes image signals which the A/D converter 40 are outputting as the original G is scanned.

The subtracter 47 subtracts the black reference signal $V_{BK}$, which is stored in the memory 44, from the image signal being output from the A/D converter 40. Meanwhile, the image signal is input to the input-level detector 48. The detector 48 determines which level the image signal being output from the A/D converter 40 has, a level corresponding to reflectance of less than 25%, a level equivalent to reflectance of at least 25% but less than 50%, a level corresponding to reflectance of at least 50% but less than 75%, or a level corresponding to reflectance of 75% to 100%, in accordance with the result of the subtraction performed by the subtracter 47. The detector 48 outputs a signal representing the level it has detected, to the selector 49. In accordance with the output signal of the input-level detector 48, the selector 49 selects one or two of the reference signals stored in the memories 461, 462, 463 and 45.

If the level detected is equivalent to any reflectance falling within the range P1 (FIG. 6), or any reflectance of less than 25%, the selector 49 selects and outputs the first intermediate reference signal $V_{M1}$ stored in the memory 461 to the signal-processing circuit 50.

If the level detected is equivalent to any reflectance falling within the range P2 (FIG. 6), or any reflectance of at least 25% but less than 50%, the selector 49 selects the first and second intermediate reference signals $V_{M1}$ and $V_{M2}$ stored in the memories 461 and 462 and output these signals to the signal-processing circuit 50.

If the level detected corresponds to any reflectance falling within the range P3 (FIG. 6), or any reflectance of at least 50% but less than 75%, the selector 49 selects the second and third intermediate reference signals $V_{M2}$ and $V_{M3}$ stored in the memories 462 and 463 and output these signals to the signal-processing circuit 50.

If the level detected is equivalent to any reflectance falling within the range P4, or any reflectance of 75% to 100%, the selector 49 selects the third intermediate reference signal $V_{M3}$ and the white reference signal $V_{WT}$-$V_{BK}$ stored in the memories 463 and 45 and output these signals to the signal-processing circuit 50.

The signal-processing circuit 50 performs shading correction on the signal output by the subtracter 47 which is the difference between the image signal and the black reference signal $V_{BK}$, by using the reference signals or signals selected and output by the selector 49.

The circuit 50 effects shading correction on each signal x output from the subtracter 47, in accordance with the following equation, thereby producing a corrected image signal X:

$$X = \{(x-a) \times (B-A)/(b-a)\} + A$$

where a is the value of the darkest pixel signal in a specific reflectance range, b is the value of the brightest pixel signal in the reflectance range, A is the constant for one of the 8 bits normalized by setting the black reference signal $V_{BK}$ and the white reference signal $V_{WT}$-$V_{BK}$ at OOH and FFH, respectively, which represents darkest pixel, B is the constant for one of said normalized 8 bits which represents the brightest pixel.

More specifically:

(1) When the input signal x falls within the range P1 (less than 25%):

$$X = x \times 40H/V_{M1}$$

(3) When the input signal x falls within the range P3 (at least 50%, but less than 75%):

$$X = \{(x - V_{M2}) \times 40H/(V_{M3} - V_{M2})\} + 80H$$

(4) When the input signal x falls within the range P2 (75% to 100%):

$$X = \{(x - V_{M3}) \times 40H/(V_{WT} - V_{BK} - V_{M3})\} + COH$$

In the case where the input signal is at a level which is equivalent to reflectance of at least 50% but less than 75% (the black reference signal $V_{BK}$ already subtracted), X will have the following value, as can be understood from FIG. 8:

$$\begin{aligned} X &= \{(x - V_{M2}) \times (COH - 80H)/(V_{M3} - V_{M2})\} + 80H \\ &= \{(x - V_{M2}) \times 40H/(V_{M3} - V_{M2})\} + 80H \end{aligned}$$

In FIG. 8, the dot-dash curve represents the relationship the output of the CCD line sensor 9 has with the reflectance of the original G, and the solid-line curve indicates the relationship the output of the the sensor 9 has with the reflectance of the original G after it has been shading-corrected.

Figure 1:
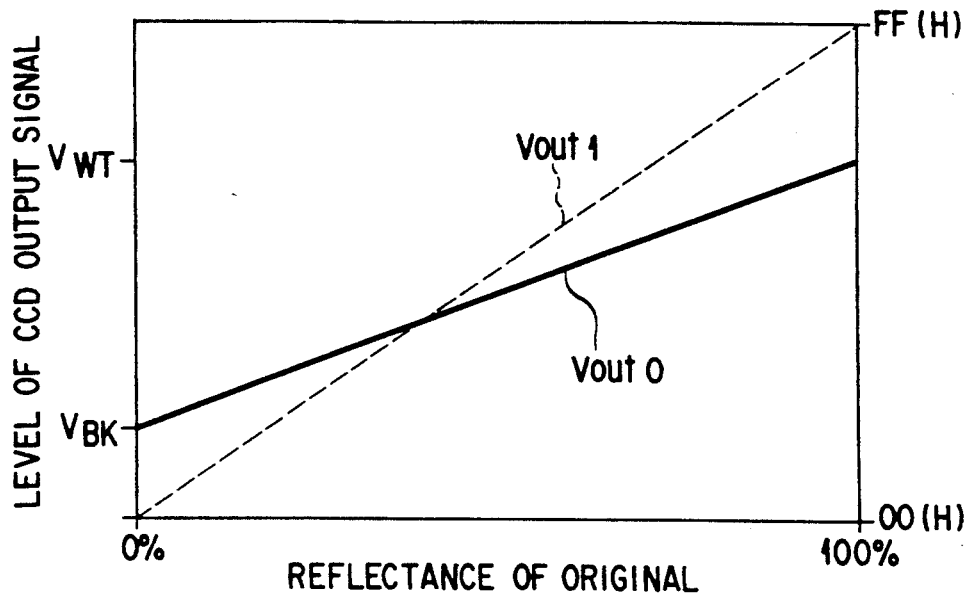
FIG. 1 is a graph representing the results of one of shading-correction methods, which is generally considered to be ideal.
Figure 2:
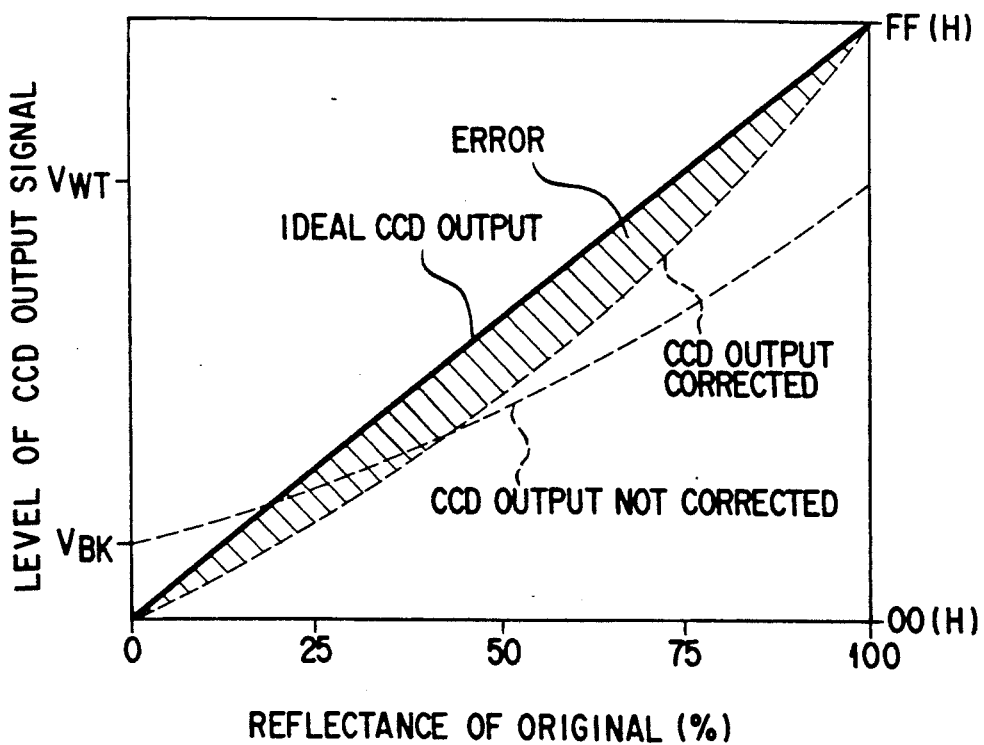
FIG. 2 is a graph illustrating the results of a shading-correction method in which only a black reference signal and a white reference signal are applied to shading-correct the output signal of a CCD line sensor.

FIG. 6 represents the results of the shading correction which the image-processing circuit 43 (FIG. 5) performs on an output signal of the CCD line sensor 9 if the sensor 9 has no linear input-output characteristic. More precisely, FIG. 6 is a graph illustrates how the output of the CCD line sensor 9 and the shading-corrected output of the sensor 9 do change with the reflectance of the original G. As comparison of FIG. 6 with FIG. 2 which illustrates the results of the conventional shading correction may reveal, the image signal output by the image-processing circuit 34 little deviates from the ideal CCD line sensor output signal.

In the embodiment described above, the three filters 16 which have the same spectral characteristic and different transmittances are inserted, one at a time, in the optical path extending between the white reference plate 10 and the CCD line sensor 9, in order to generate intermediate reference signals $V_{M1}$, $V_{M2}$ and $V_3$. Nonetheless, according to the present invention, no filters need not be used to produce intermediate reference signals. For instance, use can be made of intermediate reference plates which have different reflectances lower than that of the white reference plate 10, and the signals the CCD line sensor 9 produces from the light beams reflected from these intermediate reference plates can be used to generate intermediate reference signals.

All reference signals can generated in any order, except for the black reference signal $V_{BK}$ which must be produced prior to any other reference signal. Moreover, the number of intermediate reference signals is not limited to three. In the present invention, it suffices to use at least one intermediate reference signal.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image-reading device comprising:
   illumination means for applying light to an object to be illuminated including an original placed on an original table;
   output means for outputting electric signals in accordance with the light reflected from the original which said illumination means applies the light to;
   reference signal generating means for generating a first reference signal, a second reference signal at a level higher than that of the first reference signal, or a third reference signal at a level higher than that of the first reference signal and lower than that of said second reference signal, in accordance with the level of the electric signal outputed by said output means;
   memory means for storing the first, second, and third reference signals generated by said reference signal generating means; and
   processing means for performing shading correction on the signal outputed by said output means, by using the first, second and third reference signals stored in said memory means.

2. The image-reading device according to claim 1, wherein said first reference signal is a black reference signal, said black reference signal being an electric signal which said output means outputs when said illumination means applies no light to the original.

3. The image-reading device according to claim 1, further comprising a white reference plate located near said original table, and said second reference signal is a white reference signal, said white reference signal being an electric signal in accordance with the light reflected from said white reference plate when said illumination means applies light to said white reference plate.

4. The image-reading device according to claim 1, wherein said reference signal generating means includes means for generating at least one reference signal, having a predetermined level as said third reference signal.

5. The image-reading device according to claim 1, which further comprises a white reference plate located near the original table and a filter means for transmitting light under a predetermined transmittance, said filter means being selectively located in an optical path for guiding the light reflected from said white reference plate to said output means, wherein said third reference signal is generated from a reflected light reflected from said white reference plate and applied to said output means through said filter.

6. The image-reading device according to claim 5, wherein said filter is one of three filters having transmittances of 25%, 50%, and 75%, respectively.

7. The image-reading device according to claim 1, wherein said output means includes a line sensor for generating a plurality of bit signal of a line image as said electric signal, and said reference signal generating means comprises mean for adding levels of all bit signals of several line images output by said output means to obtain a sum output and means for calculating a signal showing the mean level of the line image according to the sum output.

8. The image-reading device according to claim 1, wherein said reference signal generating means comprises means for generating the second and third reference signals based on the first reference signal.

9. The image-reading device according to claim 1, wherein said processing means comprises signal-level detecting means for detecting the level of an signal output by said output means, a selector means for selecting two of the reference signals stored i said memory means in accordance with the level detected by said signal-level detecting means, and signal-processing means for performing shading correction on the signal output by said output means, by using the two reference signals selected by said selector means.

10. An image-reading device comprising:
    illumination means for applying light to a white reference plate and an original placed on an original table;
    output means for outputting electric signals in accordance with the light reflected from the white reference plate and the original;
    reference signal generating means including means for generating a black reference signal having a black level obtained when no light is incident to said output means, means for generating a white reference signal having a white level obtained as a difference between an output level obtained when the white reference plate is illuminated by said light and said black level, and means for generating several intermediate reference signals at levels higher than that of the black reference signal and lower than that of the white reference signal, in accordance with the level of the electric signal output by said outputed means;
    memory means for storing the black reference signal, the white reference signal, and the intermediate reference signals which have been generated by said reference signal generating means;
    signal-level detecting means for detecting the level of an signal output by said output means; and
    processing means for reading two of the reference signals stored in said memory means, in accordance with the the level detected by said signal-level detecting means, and for performing shading correction on the signal outputed by said output means, by using the two reference signals selected.

11. The image-reading device according to claim 10, wherein said output means includes a line senser for generating a plurality of bit signal of a line image as said electric signal, and said reference signal generating means comprises mean for adding levels of all bit signals of several line images output by said output means to obtain a sum output and means for calculating a signal showing the mean level of the line image according to the sum output.

12. The image-reading device according to claim 10, wherein said reference signal generating means comprises means for generating the white reference signal and the several intermediate reference signals based on the black reference signal.

13. The image-reading device according to claim 10, wherein said signal-level detecting means detects the level of the signal output by said output means, based on the difference between the black reference signal and the signal output by said output means.

14. The image-reading device according to claim 10, wherein said processing means comprises a selector means for selecting two of the reference signals stored in said memory mean in accordance with the level detected by said signal-level detecting means, and signal-processing means for performing shading correction on the signal output by said output means, by using the two reference signals selected by said selector means.

15. An image-reading device comprising:

illumination means for applying light to a white reference plate and an original placed on an original table;

output means for outputting electric signals in accordance with the light reflected from the white reference plate and the original;

first reference signal generating means including means for generating a black reference signal having a black level obtained no light is incident to said output means, means for generating a white reference signal having a white level obtained as a difference between an output level obtained when the white reference plate is illuminated by said light and said black level, second reference signal generating means having filters having the same spectral characteristic and different transmittances, for generating a plurality of intermediate reference signals having levels higher than that of the black reference signal and lower than that of the white reference signal, from the signals which said output means generates from light beams reflected from said white reference plate and applied through said filters;

memory means for storing the black reference signal and the white reference signal which said first reference signal generating means have generated, and also the intermediate reference signals which said second reference signal generating means have generated;

signal-level detecting means for detecting the level of an signal output by said output means; and processing means for reading two of the reference signals stored in said memory means, in accordance with the the level detected by said signal-level detecting means, and for performing shading correction on the signal outputed by said output means, by using the two reference signals selected.

16. The image-reading device according to claim 15, wherein said output means includes a line senser for generating a plurality of bit signal of a line image as said electric signal, and said reference signal generating means comprises mean for adding levels of all bit signals of several line images output by said output means to obtain a sum output and means for calculating a signal showing the mean level of the line image according to the sum output.

17. The image-reading device according to claim 15, wherein said reference signal generating means comprises means for generating the white reference signal and a plurality of intermediate reference signals based on the black reference signal.

18. The image-reading device according to claim 15, wherein said signal-level detecting means detects the level of the signal output by said output means, based on the difference between the black reference signal and the signal output by said output means.

19. The image-reading device according to claim 15, wherein said processing means comprises a selector means for selecting two of the reference signals stored in said memory means in accordance with the level detected by said signal-level detecting means, and signal-processing means for performing shading correction on the signal output by said output means, by using the two reference signals selected by said selector means.

* * * * *